US007720491B2

(12) United States Patent
Pinault

(10) Patent No.: US 7,720,491 B2
(45) Date of Patent: May 18, 2010

(54) METHOD OF MANAGING SMS TYPE TELEPHONE MESSAGES IN A TELECOMMUNICATIONS NETWORK

(75) Inventor: Francis Pinault, Bois-Colombes (FR)

(73) Assignee: Alcatel, Paris (FR)

( * ) Notice: Subject to any disclaimer, the term of this patent is extended or adjusted under 35 U.S.C. 154(b) by 958 days.

(21) Appl. No.: 10/299,815

(22) Filed: Nov. 20, 2002

(65) Prior Publication Data

US 2003/0125053 A1 Jul. 3, 2003

(30) Foreign Application Priority Data

Jan. 3, 2002 (FR) ................................. 02 00038

(51) Int. Cl.
*H04W 4/00* (2009.01)

(52) U.S. Cl. .................................. 455/466; 455/412.1

(58) Field of Classification Search ................ 455/466, 455/414.1, 412.1, 433, 417; 370/229
See application file for complete search history.

(56) References Cited

U.S. PATENT DOCUMENTS

| 5,946,629 | A | * | 8/1999 | Sawyer et al. | ............... | 455/466 |
| 6,064,880 | A | * | 5/2000 | Alanara | ...................... | 455/419 |
| 6,125,281 | A | | 9/2000 | Wells et al. | | |
| 6,151,507 | A | * | 11/2000 | Laiho et al. | ................. | 455/466 |
| 2002/0159387 | A1 | * | 10/2002 | Allison et al. | ............... | 370/229 |
| 2003/0045311 | A1 | * | 3/2003 | Larikka et al. | .............. | 455/466 |

FOREIGN PATENT DOCUMENTS

DE 100 61 452 A1 4/2001
EP 1 158 818 A2 11/2001

* cited by examiner

*Primary Examiner*—Quochien B Vuong
(74) *Attorney, Agent, or Firm*—Sughrue Mion, PLLC

(57) ABSTRACT

The present invention provides a method of managing SMS type telephone messages in a telecommunications network (R), said method comprising a step of receiving an SMS type telephone message (S1, S2) containing information ($I_1$, $I_2$) in a telephone terminal (1, 2) of said network, the method being characterized in that it comprises the following steps:
  a step of forwarding said information ($I_1$, $I'_2$) to a server (3) of said telecommunications network; and
  a step of identifying said telephone terminal;

and in that it further comprises the following successive steps:
  a step of storing said information ($I_1$, $I'_2$) in a memory (331, 332) of said server associated with said telephone terminal; and
  a step of sending said stored information ($I_1$, $I'_2$) to data processing equipment (4, 5, 6) of said telecommunications network and selected as a function of said telephone terminal.

13 Claims, 1 Drawing Sheet

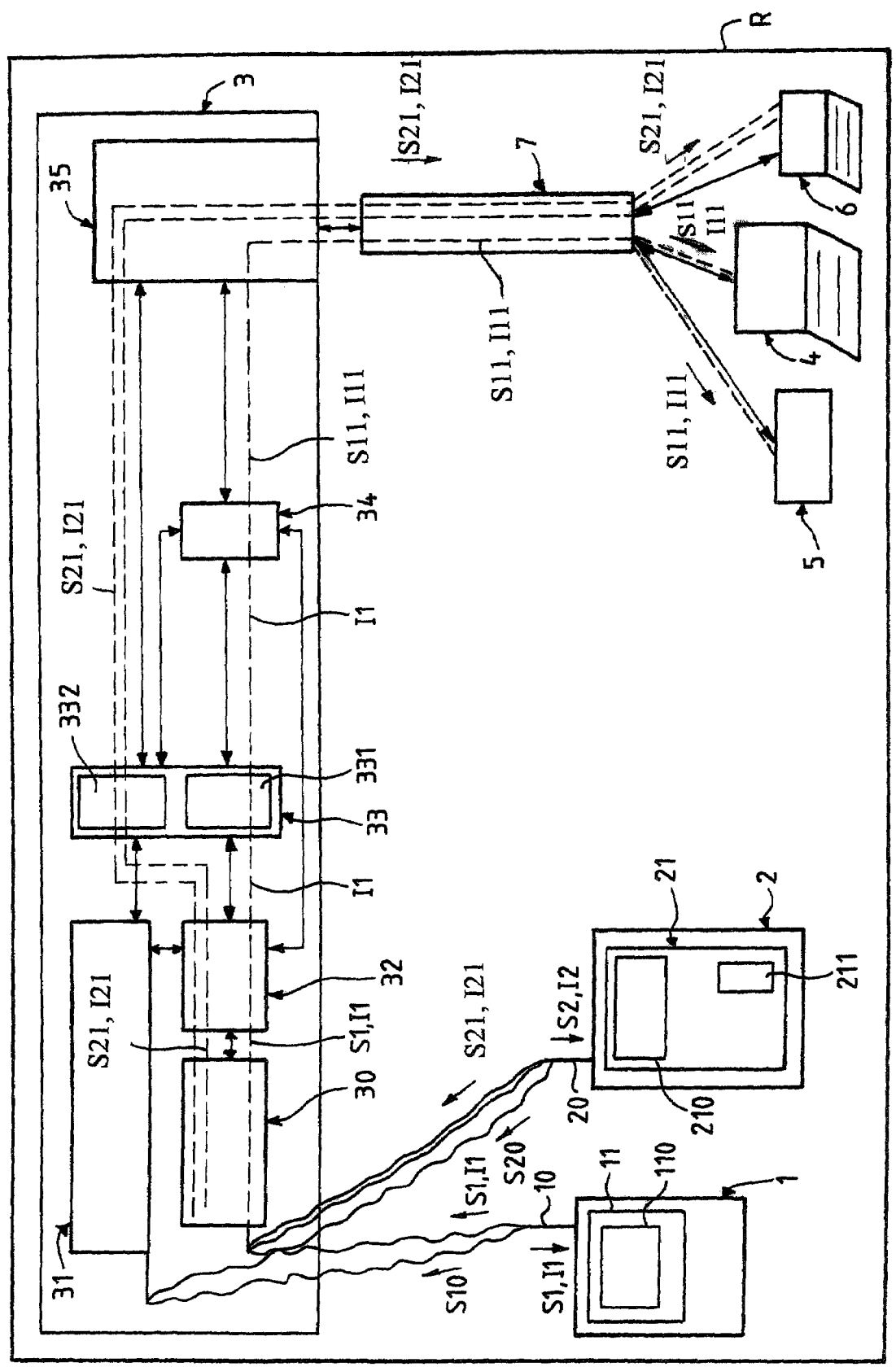

METHOD OF MANAGING SMS TYPE TELEPHONE MESSAGES IN A TELECOMMUNICATIONS NETWORK

The present invention relates to the field of telecommunications. More specifically, it relates to a method of managing SMS type telephone messages in a telecommunications network.

BACKGROUND OF THE INVENTION

In known manner, certain telephone terminals such as mobile telephones of the GSM type (Global System for Mobile Communications) can receive text messages such as Short Message Service (SMS) messages defined in Europe by the European Telecommunications Standards Institute (ETSI) and more widely, for example, by the International Telecommunications Union (ITU).

At present, in order to conserve a received message for subsequent use, the message is stored within the receiving telephone terminal, for example if it is a GSM terminal then it is stored in the Subscriber Identity Module (SIM) card which possesses a memory of small capacity. The possibility of storing a plurality of messages is thus very limited, even if it is possible in some terminals to store them in a memory that is internal to the terminal itself, since such a memory is likewise of limited size.

In addition, telephone messages in a format of the SMS type and multimedia information carriers such as music or graphics or even attached files are becoming more and more widely used. Such messages transmitted over radio links or over other types of telephone link are occupying more and more memory space and are thus worsening storage problems.

OBJECTS AND SUMMARY OF THE INVENTION

An object of the invention is to make it possible to store the content of a plurality of SMS type telephone messages received by a telephone terminal.

Another object of the invention is to make the content of an SMS type telephone message accessible to equipment other than the telephone terminal that has received the message.

The present invention thus provides a method of managing SMS type telephone messages in a telecommunications network, said method comprising a step of receiving an SMS type telephone message containing information in a telephone terminal of said network, the method being characterized in that it comprises the following steps:
  a step of forwarding said information to a server of said telecommunications network; and
  a step of identifying said telephone terminal;
and in that it further comprises the following successive steps:
  a step of storing said information in a memory of said server associated with said telephone terminal; and
  a step of sending said stored information to data processing equipment of said telecommunications network and selected as a function of said telephone terminal.

The telecommunications network providing telephony service may be a private network, for example of the Integrated Services Private Branch Exchange (ISPBX) type for use within a business, for example, or a group of businesses and duly-declared visitors thereto, or hired out to subscribers. The private network could also be of the Local Area Network (LAN) type, i.e. a network restricted to a particular area.

The method of the invention makes it possible to store information from each SMS type telephone message received by a telephone terminal in memory which is associated therewith the server of the invention.

An SMS type telephone message of the invention contains information constituting payload data corresponding to the contents to be transmitted (text, icon, image and/or sound, optionally combined in an attached file), possibly also with control data enabling the message to be transmitted correctly, and for example making it secure. The information forwarded such as the information stored in accordance with the invention can, for example, be the payload data of the SMS type telephone message.

The step of forwarding the received information to the server can be initiated by the user of the telephone terminal receiving the message or by the server, e.g. by regularly interrogating the terminal. The step of forwarding the information can be implemented, for example, from applications developed within the GSM context such as the Sim Application Tool Kit (SATK), which serves to present a specific menu that is independent of the terminal so as to allow the user to perform an action of forwarding the telephone message.

The step in accordance with the invention of identifying the telephone terminal enables the proprietor or main user of the terminal to be identified, for example by the Calling Identification Presentation (CLIP) tool for a cellular telephone. This identification step may be performed, for example, by discovering information specific to the content of the SMS type message and bearing the identification of the sender, or by examining a signalling message sent by the terminal and distinct from the SMS type message.

Once the identification step has been performed, it is possible to select the data processing equipment (personal digital assistants, computers, . . . ) associated with said proprietor or main user and to which the previously stored information is to be sent. Furthermore, equipment selection can also be performed implicitly.

Thus, the method of the invention increases the mobility management capacity of members of the telecommunications network at an information transmission cost that is moderate.

The method of the invention also makes it possible to allocate management of confidential information to the server instead of to the telephone terminal.

The step of sending stored information may be initiated by the user of the data processing equipment, e.g. by downloading the information that has been stored in the form of a web page via the Internet or an Intranet type network included in the telecommunications network of the invention.

A system for acknowledging receipt may also be provided, the server and/or data processing equipment informing the telephone equipment firstly that storage has indeed been achieved, and secondly that the information has indeed been received, respectively.

Advantageously, the method of the invention may include a step of creating e-mail including the information addressed to the data processing equipment.

This step of creating an e-mail may be implemented within the telephone terminal prior to the forwarding step or after the storage step, for example within the server of the invention. The e-mail that is created may then be managed by a standard dedicated e-mail application such as "Lotus Domino" or "Outlook" (registered trademarks) for example or belonging to the server.

The term "e-mail" is used to mean data which is suitable for being transmitted, for example, by the server using a protocol of the Internet Protocol (IP) type or, for example, by the cellular telephone type terminal of the invention using a wireless application protocol (WAP) gateway. The electronic mail may be of the text and/or voice type and may contain attached files. It presents the particular advantage of dating the transmission of the SMS type telephone message and of enabling additional data to be added.

The method of the invention may preferably comprise a step of analyzing the forwarded information in order to identify the nature thereof (whether the formatting of the telephone message is of the SMS type or of the e-mail type, the type and quantity of payload data, of control data, . . . ).

The invention also proposes a telecommunications network server for implementing the above-described method, characterized in that it comprises:

receiver means for receiving the information of SMS type telephone messages;

identifier means for identifying telephone terminals;

said memory associated with said telephone terminal; and means for sending the information of the SMS type telephone messages.

Advantageously, the server may comprise means for creating e-mail messages containing the information of the SMS type telephone messages.

Preferably, the server may comprise means for analyzing the information of SMS type telephone messages.

In a preferred embodiment, the associated memory of the server is temporary.

In this way, the memory can be associated in succession with distinct terminals, for example. Furthermore, the memory may present certain conventional memory characteristics (active memory, addressable memory, . . . ). By way of example, the memory may be of the dynamic random access memory (DRAM) type.

The invention also provides a telephone terminal for a telecommunications network for implementing the above-described method, the terminal comprising means for receiving SMS type telephone messages and being characterized in that it comprises management means for managing SMS type telephone message information, and forwarding means for forwarding SMS type telephone message information.

The management means may comprise, for example, a presentation menu informing the user of the facilities offered for managing SMS type telephone messages: conservation in memory prior to forwarding; deletion of message; request for acknowledgment of receipt; selection of the information to be forwarded; formatting the forwarded information; preselection of destination data processing equipment, . . . .

In an embodiment of the invention, the management means comprise means for converting the SMS type telephone message into e-mail, e.g. containing payload data together with other added information (date of reception, name of message sender, . . . ).

The terminal may be a mobile or fixed telephone or station since even if the SMS standard was originally defined for mobile applications, it can be used for applications involving telephone terminals that are fixed and/or connected to the telecommunications network of the invention by means other than a cellular network.

The terminal of the invention is preferably selected from mobile terminals such as telephones of the following types: GSM, DECT (Digital European Cordless Telecommunications), PCS (Personal Communication Services), or UMTS (Universal Mobile Telecommunications System).

BRIEF DESCRIPTION OF THE DRAWING

The characteristics and objects of the present invention appear from the detailed description given below with reference to the accompanying FIGURE given solely by way of non-limiting illustration.

The sole FIGURE is a block diagram of a preferred implementation of the method of the invention for managing SMS type telephone messages in a telecommunications network.

MORE DETAILED DESCRIPTION

The sole FIGURE thus shows a telecommunications network R constituted by a local business network providing GSM type radiotelephone service between GSM telephones 1 and 2. The network R also provides a radiomessaging service enabling SMS type messages to be transmitted between the GSM telephones, together with a radiomessage management service enabling the information in SMS messages to be transmitted to data processing equipment such as computers 5 and tablet type Personal Digital Assistants (PDAs) 4 or pocket computers 6. These items of equipment 4, 5, 6 are connected to an Intranet included in the network R so as to be able to receive e-mail or to download web pages via IP type links 7.

The network R also comprises a server 3 which acts as an intermediary between the GSM telephones that send SMS message type information and the destination equipment 4, 5, 6.

Each GSM telephone 1, 2 comprises:

an antenna 10, 20 capable of receiving calls and SMS messages and of forwarding these SMS messages or at least the payload data of said SMS messages; and means 11, 21 for managing SMS message information, said means including a menu 110, 210 for presenting the options available.

Certain GSM telephones 2 may be connected to the Intranet via the WAP and also include means for converting an SMS type telephone message into an e-mail containing the information from the SMS message, and in particular its payload data.

The server 3 comprises:

receiver means 30 for receiving SMS message information;

identifier means 31 of the CLIP type for identifying the GSM telephones 1, 2 of the network R that forward information from received SMS messages;

analyzer means 32 for analyzing the forwarded information;

memory space 33 comprising memories, e.g. temporary memories 331, 332, each of which is associated with a GSM telephone 1, 2 and stores all or some of the information that has been forwarded and analyzed;

means 34 for creating e-mail messages containing the stored information; and means 35 for sending stored information, e.g. in the form of an e-mail.

The path followed by two SMS type messages (shown in dashed lines in the figure) and the way those messages are modified, e.g. text type messages S1 and S2 received respectively by the GSM telephones 1, 2 are described below.

Each SMS message S1, S2 comprises in particular information such as payload data $I_1$, $I_2$ (commercial information, economic information, information relating to the safety of an isolated worker, . . . ).

The received SMS message S1 is managed by the management means 11. The display menu 110 makes it possible to decide whether to forward the SMS message as it stands to the server 3, and for example to preselect the PDA 4 and the computer 5 belong to the proprietor or user of the GSM telephone 1 and that are going to make use of the payload data $I_1$.

Thereafter, the receiver means 30 receive the message S1 and in parallel the identifier means 31 receive and identify the GSM telephone 1 sending a signalling message S10 indicating in particular that the SMS message S1 is being forwarded. These means 31 then determine which destination equipment 4, 5 has been preselected and determine which storage memory 331 is associated therewith.

In addition, the analyzer means 32 scan the SMS message S1 and filter out superfluous information, and in co-operation with the means 31 send the payload data $I_1$ for storage in the memory 331.

Thereafter, the stored payload data $I_1$ is converted by the means 34 which deliver the payload data I11 in a specific format which is transmitted by means of an e-mail S11 via the means 35 and the link 7 to the PDA 4 and the computer 5, in succession or in parallel.

The received SMS message S2 is managed by the management means 21. The display menu 210 directs the SMS message S2 for creating an electronic message, converting the SMS message S2 into email S21 containing in particular and in a specific format the payload data I21. The menu 210 may also request an acknowledgment of receipt from the destination pocket computer 6.

Thereafter, the receiver means 30 receive the e-mail S21, and in parallel the identifier means 31 receive and identify the GSM telephone 2 sending a signalling message S20 specifying in particular that the e-mail S21 is being sent. These means 31 also locate the pocket computer 6 and the associated storage memory 332.

In addition, the analyzer means 32 recognize the e-mail S21 and the format of the forwarded information, and in co-operation with the means 31 sends the information into the storage memory 332.

The e-mail S21 containing the payload data I21 is then directly via the means 35 and the link 7 to the pocket computer 6. On reception, the pocket computer generates the requested acknowledgment of receipt.

Naturally, the above description is given purely by way of illustration. Without going beyond the ambit of the invention, it is possible to replace any means by equivalent means.

The telecommunications network may offer a variety of telephone services, and some of the telephone terminals of the invention can be mobile while others are fixed.

Storage memories of the invention can equally well be permanent.

The server of the invention may decide on which e-mails have priority, and the server can make it possible for the information stored to be interrogated remotely or downloaded by equipment having authorized access to the storage memory.

What is claimed is:

1. A method of managing short message service (SMS) type telephone messages in a telecommunications network, said method comprising:
   receiving an SMS type telephone message containing information at a telephone terminal of said network;
   forwarding said information to a server of said telecommunications network;
   identifying said telephone terminal;
   storing said information in a memory of said server associated with said telephone terminal; and
   sending said stored information to data processing equipment of said telecommunications network, the data processing equipment being selected at the time of the forwarding at said telephone terminal;
   wherein said data processing equipment is associated with said telephone terminal.

2. The method according to claim 1, further comprising creating an e-mail including the information that is to be sent to said data processing equipment.

3. The method according to claim 1, further comprising analyzing the forwarded information.

4. The method according to claim 1, wherein said data processing equipment comprises at least one of a computer, a person digital assistant, and a pocket computer.

5. The method according to claim 1, wherein the telephone terminal is selected from amongst a plurality of mobile terminals.

6. A server of a telecommunications network, the server comprising:
   receiver means which receives information from a telephone terminal of said network, said information being contained in a short message service (SMS) type telephone message received by said telephone terminal;
   identifier means which identifies said telephone terminal;
   a memory which is associated with said telephone terminal and stores said information; and
   means for sending the information to data processing equipment of said telecommunications network, the data processing equipment being selected at the time of the forwarding at said telephone terminal;
   wherein said data processing equipment is associated with said telephone terminal.

7. A server according to claim 6, further comprising means for creating e-mail containing the information of SMS type telephone messages.

8. The server according to claim 6, further comprising an analyzer means for analyzing the information of an SMS type telephone message.

9. The server according to claim 6, wherein said associated memory is temporary.

10. A server according to claim 6, wherein said data processing equipment comprises at least one of a computer, a person digital assistant, and a pocket computer.

11. A telephone terminal of a telecommunications network, the telephone terminal comprising:
   receiver means for receiving a short message service (SMS) type telephone message;
   management means for managing information contained in the SMS type telephone message,
   forwarding means for forwarding the information as e-mail messages to a server of the telecommunications network which sends the information to data processing equipment of said telecommunications network; and
   selection means for selecting the data processing equipment to which the information is sent at the time of the forwarding of the e-mail messages;
   wherein said data processing equipment is associated with said telephone terminal.

12. A telephone terminal of a telecommunications network, the telephone terminal comprising:
   receiver means for receiving SMS type telephone messages, comprising:
      management means for managing SMS type telephone message information, and
      forwarding means for forwarding SMS type telephone message information in e-mail messages;

wherein the forwarding means forwards the SMS type telephone messages to data processing equipment of said telecommunications network, the data processing equipment being selected by said telephone terminal at the time the SMS type telephone messages are forwarded.

13. The telephone terminal of claim 12, wherein the management means converts SMS type telephone message information into an e-mail message.

* * * * *